(12) United States Patent
Clauberg et al.

(10) Patent No.: US 8,629,619 B2
(45) Date of Patent: Jan. 14, 2014

(54) METHOD AND APPARATUS FOR CONTROLLING DIMMING LEVELS OF LEDS

(75) Inventors: Bernd Clauberg, Schaumburg, IL (US); Richard Greischar, Oak Park, IL (US); Ameya Shrotriya, Schaumburg, IL (US)

(73) Assignee: Koninklijke Philips N.V., Eindhoven (NL)

( * ) Notice: Subject to any disclaimer, the term of this patent is extended or adjusted under 35 U.S.C. 154(b) by 93 days.

(21) Appl. No.: 13/392,530

(22) PCT Filed: Aug. 18, 2010

(86) PCT No.: PCT/IB2010/053729
§ 371 (c)(1),
(2), (4) Date: Apr. 18, 2012

(87) PCT Pub. No.: WO2011/024101
PCT Pub. Date: Mar. 3, 2011

(65) Prior Publication Data
US 2012/0194079 A1      Aug. 2, 2012

Related U.S. Application Data

(60) Provisional application No. 61/236,998, filed on Aug. 26, 2009.

(51) Int. Cl.
*H05B 37/00*      (2006.01)

(52) U.S. Cl.
USPC ............................ 315/125; 315/119; 315/307

(58) Field of Classification Search
USPC .......... 315/123, 125, 119, 306, 307, 191, 310
See application file for complete search history.

(56) References Cited

U.S. PATENT DOCUMENTS

| | | | |
|---|---|---|---|
| 7,649,325 B2 * | 1/2010 | McIntosh et al. | 315/291 |
| 7,656,103 B2 * | 2/2010 | Shteynberg et al. | 315/312 |
| 2006/0261754 A1 * | 11/2006 | Lee | 315/291 |
| 2008/0297058 A1 | 12/2008 | Soos | |
| 2009/0184662 A1 | 7/2009 | Given et al. | |
| 2012/0299501 A1 * | 11/2012 | Kost et al. | 315/224 |

FOREIGN PATENT DOCUMENTS

WO      2009101544 A2      8/2009

* cited by examiner

*Primary Examiner* — James H Cho
(74) *Attorney, Agent, or Firm* — Yuliya Mathis

(57) ABSTRACT

Circuits useful in achieving efficient current control of LEDs based on a dimming control input are described. The circuits use a combination of PWM dimming and analog dimming to achieve a highly efficient LED driver over a wide range of dimming from near 0% to 100% light output.

16 Claims, 2 Drawing Sheets

METHOD AND APPARATUS FOR CONTROLLING DIMMING LEVELS OF LEDS

TECHNICAL FIELD

The present invention is directed generally to controlling dimming levels of light emitting diodes (LEDs). More particularly, various inventive methods and apparatus disclosed herein relate to controlling drive current above and below a threshold level.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Significant advances have been made in manufacturing of LEDs emitting white light. Currently, white light LEDs are commercially available which generate more than 100 lumens per watt. This is comparable to the performance of fluorescent and HID lamps. In addition, these LEDs offer other advantages such as longer operating life, shock/vibration resistance and design flexibility because of their small size. As a result, white light LEDs are gaining acceptance as a replacement for traditional incandescent sources, compact fluorescent and HID for illumination applications such as signage, accenting, and pathway lighting, downlighting, parking lot and roadway lighting. The white LEDs can be used alone or in conjunction with colored LEDs for a particular effect.

The electrical characteristics of LEDs are such that small changes in the voltage applied to the LED lamp will cause appreciable current changes. In addition, ambient temperature changes will also result in LED current changes by changing the forward drop across the LEDs. Furthermore, the lumen output of LEDs depends on the LED current. The existing electrical power supplies for LED light sources are designed to precisely regulate the LED current to prevent luminous intensity variations due to input AC voltage variations and ambient temperature. Operation of LED lamps at excessive forward current for a long period can cause unacceptable luminous intensity variations and even catastrophic failure. In addition, current electrical power supplies do not minimize power consumption to maximize energy savings.

It is often desirable to provide a dimming capability to LEDs and lighting fixtures employing LEDs. Known ways of dimming LEDs include pulse-width modulation (PWM) "chopping" of the current waveform and analog reduction of the amplitude of the current waveform. Unfortunately, using known analog amplitude reduction and PWM dimming it is difficult to obtain good efficiency and good performance over an entire dimming range of 0% light output (no light output) to 100% light output(full light output). Many known high efficiency LED drivers use a switch mode converter to regulate the current to the LED's. To achieve "deep dimming", (e.g., dimming to less than 5% and up to 30%), PWM pulsing of the LED current is typically used to ensure proper operation of the LED's. With a current source output, PWM dimming requires a shunt switch that shunts the LED current during the "off" pulses of the PWM cycle. As such, relatively high losses are realized in the main converter and the shunt switch because the current to the LEDs is at a comparatively high level, even though only a portion is of the current is being delivered. Accordingly, known shunt switches and their methods of use are comparatively inefficient in LED applications involving dimming. In addition, the efficiency (Im/W) of LED's us comparatively high at lower drive currents, and as a result known PWM dimming methods are less efficient than known analog dimming methods. However, analog dimming also has some disadvantages at low dim levels. For example, if the LED current is less than approximately 5% and as great as 30% of the full output rating, light levels might not be uniform between different LEDs, color shifts can occur, and at very low current levels efficiencies of the LED's are also comparatively poor. In addition, the driver electronics become more difficult as the current levels drop below 1%, offset voltages and electrical noise in the current sensing circuitry become a major concern. At dim levels below 0.1% these issues make analog dimming undesirable.

Thus, there is a need in the art to provide dimming of LEDs that overcomes at least the drawbacks of known dimming methods described above.

SUMMARY

The present disclosure is directed to inventive methods and apparatuses for controlling dimming levels. Applicants have recognized and appreciated that it would be beneficial to provide more efficient dimming of LEDs over the entire dim range of 0% to 100% dimming in a manner that overcomes certain shortcomings in analog and pulse width modulation (PWM) dimming. Applicants have further recognized and appreciated that it would be beneficial to provide analog dimming to a certain dimming level, and to provide PWM dimming for dimming to below a certain dimming level.

In accordance with one aspect, the present disclosure focuses on a dimming circuit for an LED comprises a current controller configured to receive a dimming input provide a pulse width modulation signal (PWM) and a reference voltage. The dimming circuit also comprises a current converter configured to provide an output current; and a shunt switch connected to the controller and to the current converter and between the current controller and the LEDs, wherein the shunt switch is non-conducting when the dimming input is more than a threshold level.

In accordance with another aspect, the present disclosure focuses on a dimming circuit for an LED comprises a controller configured to receive a dimming input provide a pulse width modulation signal (PWM) and a reference voltage. The dimming circuit also comprises a current converter configured to provide an output current; and a buck converter connected between the LEDs and current converter, wherein the buck converter comprises a shunt switch that is non-conducting when the dimming input is less than a threshold level.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

Figure 1:
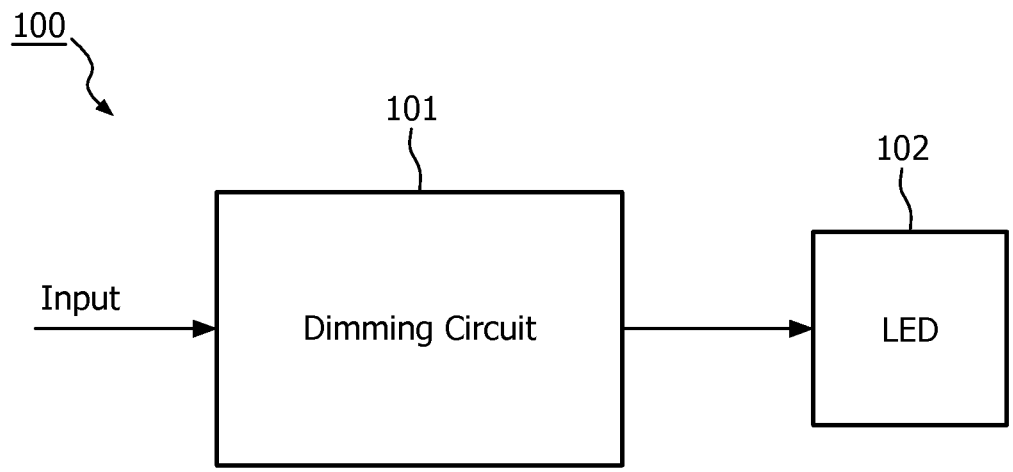
FIG. 1 illustrates a simplified block diagram of a lighting fixture in accordance with a representative embodiment.

FIG. 1 illustrates a simplified block diagram of a lighting apparatus 100 in accordance with various embodiments of the invention. The lighting apparatus includes a dimming circuit 101, which receives an input voltage, such as a line voltage. Based on a desired dimmer setting, the dimming circuit 101 provides a particular drive current to an LED 102. In a representative embodiment, the lighting apparatus may be provided in a housing with the dimming circuit and LED in a common or separate package.

Figure 2:
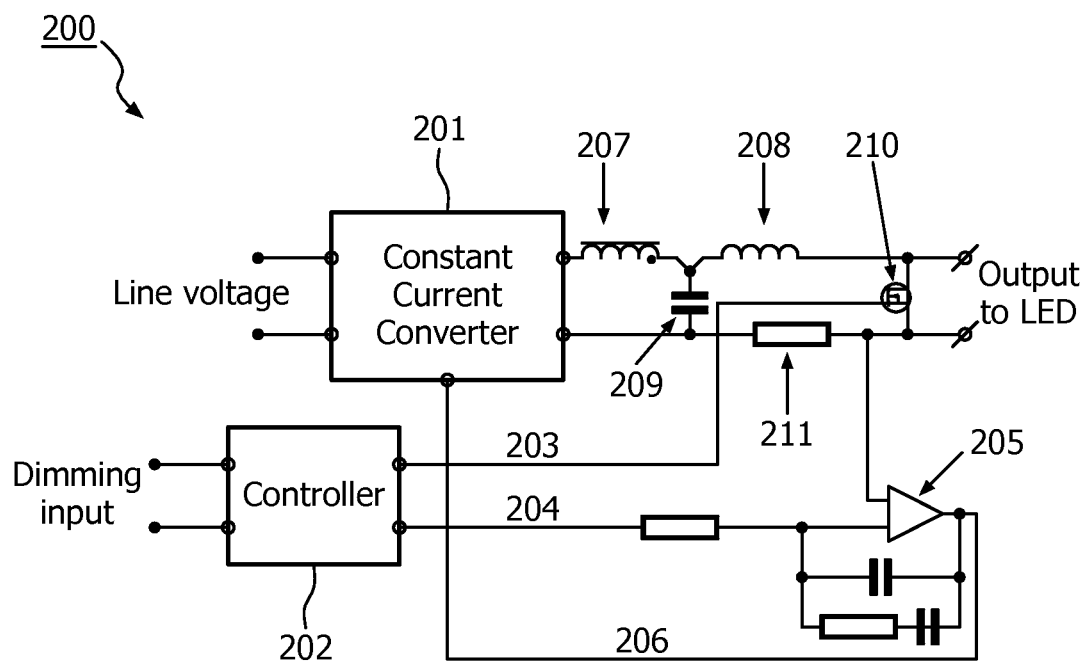
FIG. 2 illustrates a simplified schematic diagram of a dimming circuit in accordance with a representative embodiment.

FIG. 2 illustrates a simplified schematic diagram of a dimming circuit 200 in accordance with a representative embodiment. The dimming circuit 200 is contemplated for use as the dimming circuit 101 of lighting fixture 100 in FIG. 1. The dimming circuit 200 comprises a constant current converter ('converter') 201 and a controller 202. The controller 102 receives a dimming input and the converter 101 receives an input voltage. In a representative embodiment, the converter 201 is a known power supply configured to receive an input from one of a variety of known power sources which are illustratively an AC voltage (line voltage), a DC voltage or low voltage AC source. The converter 201 provides an output current based on the input voltage. As described more fully herein, a PWM signal 203 is provided to a shunt switch (e.g., a field effect transistor (FET)) 110 (Q1).

In a representative embodiment, the controller 202 includes a known microprocessor comprising memory and logic, and is configured to receive the dimming input and to provide a PWM signal 203 and a reference voltage ($V_{ref}$) 204. The use of a microprocessor is merely illustrative, and the use of a programmable logic device (PLD) such as a field programmable gate array (FPGA), or an application specific integrated circuit (ASIC), or discrete electronic components are also contemplated for use in the controller 202.

The reference voltage ($V_{ref}$) 204 provides one input to an error amplifier circuit 205. Current to the LEDs flows through a sensing resistor (R1) 211, which produces a sense voltage that is provided as another input to the error amplifier circuit 205. The error amplifier circuit 205 compares the sense voltage signal to the reference voltage ($V_{ref}$) 204. A feedback signal 206, which is based on the output of the error amplifier circuit 205, is provided to the converter 201. In response to the value of the feedback signal 206, the converter 201 increases or decreases the current to the LEDs until the sensed voltage at sensing resistor (R1) 211 is substantially identical to the reference voltage ($V_{ref}$) 204.

In operation, the converter 201 provides a comparatively constant current to a first inductor 207 (L1). The current from the converter 201 in turn flows to a second inductor (L2) 208. The second inductor (L2) 208 in conjunction with capacitor (C1) 209 beneficially reduces current ripple and provides a substantially constant DC current to either the LEDs (not shown in FIG. 2) or to the shunt switch (Q1) 210. Capacitor (C1) 209 and second inductor (L2) 208 have respective values selected so that the switching of shunt switch 210 (Q1) does not significantly alter the voltage at capacitor 209 (C1), and so the current in the second inductor (L2) 208 remains substantially constant. This nearly constant current then flows either to the LEDs directly or through the shunt switch (Q1) 210.

The current flow to either the LEDs directly or to the shunt switch 210 (Q1) depends on the level of dimming provided at the dimming input to the controller 202. Often, in order to avoid color level shifts and to provide a base level of efficiency, a minimum current amplitude is specified. This minimum current amplitude is often expressed in terms of a percentage of a maximum current level or amplitude through the LED junction. For example, an LED manufacturer or lamp manufacturer may specify a minimum current amplitude required of the LEDs as percentage of a maximum current amplitude that can be delivered to the LEDs.

For illustrative purposes, suppose this minimum currently is approximately 10% of the maximum current amplitude of the LEDs used in the lighting fixture 100. It is emphasized that the percentage of the maximum current amplitude may be less than or greater than 10%, and this value is selected only for ease of explanation. In accordance with the representative embodiment described in connection with FIG. 2, when the dimming input to the controller 202 is between 100% of this maximum current level to 10% of the maximum current level, the PWM signal 203 output from the controller 202 is at a voltage that reverse biases the shunt switch 210 (Q1) so that it is not conducting and is 'off', and the reference voltage (Vref) 204 is at a level proportional to the dimming input. The reference voltage (Vref)) 204 is input to error amplifier circuit 205 and provides a feedback 206 to the converter 201 that is proportional to the error signal between the desired current set point (reference voltage (Vref) 204) and the actual LED current sensed across sensing resistor (R1) 211. The feedback 206 is input to the converter 201, and the output from the converter 201 is an analog output that provides the desired current level to the LED.

By contrast, and keeping with the illustrative values, when the dimming input to the controller 202 is approximately 10% or less (to approximately 0%), the controller 202 provides the reference voltage (Vref) 104 of 10% (or less, as selected) of the maximum value. The PWM signal 203 to the shunt switch (Q1) 210 selectively biases the shunt switch (Q1) 210 on at a set duty cycle. In the present representative embodiment with a threshold level of 10% of the maximum LED drive current, the PWM signal 203 has an off duty cycle that substantially matches the desired dim level divided by 10 (since the average current is already reduced to 10%). For example, a PWM off duty cycle of 1% corresponds to a dim level of 0.1%.

Beneficially, because the shunt switch (Q1) 210 is forward biased (turned 'on') only when the current through the first inductor (L1) 207 and the second inductor (L2) 208 are reduced to a level at or below a selected fraction (e.g., 10% or less) of the maximum current level, losses in the shunt (Q1) 210 are minimized. In addition, the circuit 200 allows the shunt switch (Q1) 210 to have a comparatively high resistance, and in turn a comparatively low capacitance. This reduces the likelihood of switching losses in case a comparatively high PWM frequency is desired. To this end, in an illustrative embodiment, the shunt switch (Q1) 210 is a metal oxide semiconductor field effect transistor (MOSFET) with a voltage rating of 600 V (assuming the LED system is high voltage output), has a resistance of approximately 1.2Ω, and an output capacitance of approximately 100 pF. If the shunt switch (Q1) 210 of the present example (i.e., a MOSFET) would conduct the entire current (e.g., 1A) from the converter 101, the conduction loss alone would be already 1 W at the point where the on-time of shunt switch (Q1) 210 is near 100%. As can be appreciated, such loss is not desirable. By contrast, and in accordance with representative embodiments, if the current through the shunt switch (Q1) 210 is limited to 10% or less than the maximum current level, the conduction loss of the same MOSFET is significantly lower; illustratively 0.012 W under the same conditions and parameters. Because of this significant reduction in conduction losses the resistance of the shunt switch 210 (Q1) may be selected to be greater. Continuing with the same example, if the shunt switch 210 (Q1) were a MOSFET with higher resistance (e.g. 10Ω) the output capacitance would drop significantly (e.g., a factor of 10 in the present example). Beneficially, the conduction losses and switching losses are significantly reduced (by a factor of 10 in the present example), and the switching time is also reduced due to the reduced capacitance. Notably, reducing the switching time of the shunt switch (Q1) 210 may be especially beneficial because comparatively precise dimming control benefits from comparatively fast switching transitions, which are effected by providing a switch (e.g., shunt switch 210 (Q1) with a comparatively low capacitance, in the representative embodiments. In addition, a MOSFET with 10 times the on-resistance is much less expensive than a lower resistance FET.

Notably, the frequency of the PWM signal 203 provided to the shunt switch (Q1) 210 can be selected to optimize performance of the circuit 200. In practice, it is desired to have a substantially constant current in first inductor (L1) 207 and substantially constant voltage across the capacitor (C1) 109 while the shunt switch (Q1) 110 turns on and off at a fixed duty cycle in response to the PWM signal 203. This ensures that the current in the LEDs is proportional to the duty cycle of the shunt switch, or to the inverse duty cycle. In accordance with a representative embodiment, these conditions are achieved by choosing a sufficiently high PWM frequency for the shunt switch (Q1) 210. In a representative embodiment, the power supplies are isolated, and beneficially the converter 101, which provides isolation, never stops switching and, therefore, continuously provides sufficient power to any auxiliary supply windings needed to drive the current feedback amplifiers and dimming interface controllers as the minimum converter output current is fixed at a non-zero minimum level (e.g., 10% or less of max in the above example). The frequency of the PWM signal 203 for LEDs is typically chosen to be in the order of a 200 Hz to 5 kHz. However, to reduce the size of the second inductor L2 (209) and the capacitor (C1) 210, it is possible to operate the shunt switch (Q1) 210 at even higher frequencies. This is especially the case when the shunt switch (Q1) 210 is a relatively high resistance, low capacitance device that allows the fast switching transitions.

Figure 3:
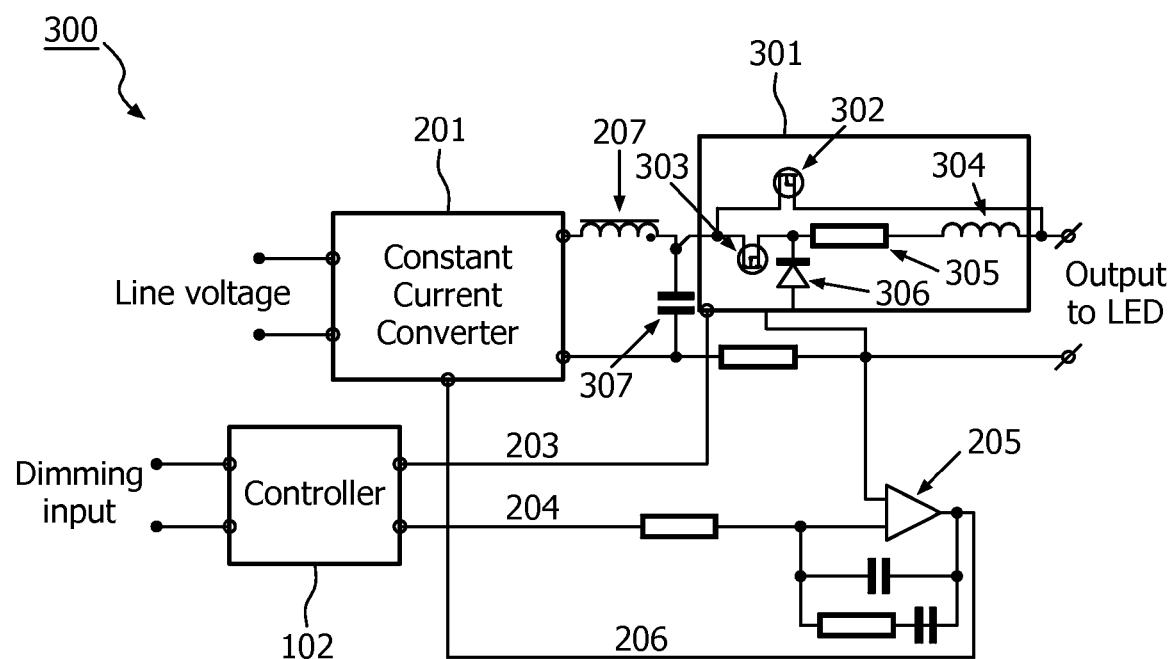
FIG. 3 illustrates a simplified schematic diagram of a dimming circuit in accordance with another representative embodiment.

FIG. 3 illustrates a simplified schematic diagram of a dimming circuit 300 in accordance with another representative embodiment. The dimming circuit 300 is contemplated for use as the dimming circuit 101 of lighting fixture 100 in FIG. 1. Many of the details of the components described in connection with the embodiments of the dimming circuit 200 illustrated in FIG. 2 are common to the embodiments of the dimming circuit 300. Many of these common details are not repeated in order to avoid obscuring the description of the presently described embodiments. Moreover, like the embodiments described in connection with FIG. 2, the dimming circuit 300 provides efficient dimming of LED's over the entire dim range of approximately 0% to approximately 100%. Like dimming circuit 200, dimming circuit 300 provides analog dimming from converter 201 to a threshold level that ensures proper LED operation with minimal color shift.

The dimming circuit 300 comprises converter 201 and controller 202. The controller 202 receives a dimming input and the converter 201 receives an input voltage, such as an AC line voltage. In a representative embodiment, the controller 202 comprises a known microprocessor comprising memory and logic and is configured to receive the dimming input and provide PWM signal 203 and reference voltage ($V_{ref}$) 204. The use of a microprocessor is merely illustrative, and the use of a programmable logic device (PLD) such as a field programmable gate array (FPGA) or an application specific integrated circuit (ASIC) are also contemplated for use in the controller 202. The reference voltage (Vref) 204 comprises one input to an amplifier circuit 205.

The dimming circuit 300 comprises a buck converter 301 that pulse-width modulates the output current from a threshold level (e.g., 10% of the maximum current amplitude to the LED) to 0% current, or 100% dimming. The buck converter 301 comprises a first switch (Q1) 302 in parallel with a second switch (Q2) 303, an inductor 304 and a resistor 305. A diode (D1) 306 is provided between the output of the second switch 303 (Q2) and an input to the error amplifier circuit 205. The buck-converter 301 may be as described in commonly owned US Patent Application Publication 20080278092 entitled "HIGH POWER FACTOR LED-BASED LIGHTING APPARATUS AND METHODS" to Lys, et al. The disclosure of this patent application publication is specifically incorporated herein by reference. In accordance with representative embodiments, the buck converter 301 can either operate at high frequency compared to the frequency PWM signal 203 and use a known control method, or use a hysteretic or peak current control method to obtain comparatively fast and comparatively precise current control. The switching frequency of the buck converter 301 is illustratively in the range of approximately 100 kHz to approximately 500 kHz. Switching losses are low if the capacitance of the second switch (Q2) 303 and the diode (D1) 306 are comparatively small (on the order of $10^1$ pF). This can be accomplished if the on-resistance of the second switch (Q2) 303 is chosen high enough and the current rating of the diode (D1) 306 is chosen low enough. As such, in accordance with representative embodiments, the current through the buck converter 301 is maintained at a comparatively low amplitude first (e.g., 10% or less of the maximum current of the LEDs), which allows the selection of the on-resistance of the second switch (Q2) 303 to be comparatively high, and which allows comparatively low current across the diode (D1) 306 without significant conduction losses. For example, a diode with a current rating of 1 A might have a junction capacitance of 20 pF-50 pF; whereas a diode (e.g., diode (D1) 306) with a current rating of 0.1 A might have a junction capacitance in the range of approximately 1 pF to approximately 5 pF, which is comparatively low. The switching losses are proportional to frequency, so a factor of 10 reduction in capacitance translates to a factor of 10 reduction in switching losses, which can be very significant at operating frequencies of 100 kHz to 500 kHz.

In accordance with representative embodiments the buck converter 301 is operated at a comparatively high switching frequency to allow low output current ripple into the LEDs (i.e. substantially constant LED current) with a small value of the inductor 304 (L2). Notably, incorporating a comparatively small value inductance in the inductor 304 (L2) will determine how quickly the inductor 304 (L2) can discharge during the "off" PWM cycle. Basically, the inductor 304 (L2) determines the switching speed of the PWM cycle and, therefore, the maximum frequency of the PWM signal 203 and the rise time and fall time of the PWM signal 203. As such, the inductor 304 (L2) of the buck converter 301 determines the dimming resolution and minimum dimming level achievable in the dimming circuit 300.

Notably, however, the frequency of the PWM signal 203 cannot be chosen arbitrarily small. At PWM frequencies on the order of approximately 100 Hz might result in visible flicker; and even PWM frequencies as low as 500 Hz can be a problem for photography. As such, in accordance with representative embodiments, in order to avoid detectable flicker and to provide a better output light quality of the LEDs the frequency of the PWM signal is set above a threshold level. In practice, the buck converter 301 operates at a frequency at least 100 times higher than the PWM frequency to enable a PWM duty cycle of approximately 5% with acceptable accuracy. For lower dim levels, an even higher buck frequency is necessary.

In keeping with the illustrative range described above, the analog dimming may be implemented from dimming from approximately 0% dimming (i.e., no dimming, and 100% of the maximum current amplitude to the LED) down to 90% dimming (i.e., 10% of the maximum current amplitude to the LED). Below 90% dimming, a high frequency buck converter 301 is used to PWM the output current from 10% to 0%. Notably, however, the buck converter 201 allows the threshold level to be set at approximately 5% of the maximum current amplitude to the LEDs. As noted above, the buck converter 201 can either operate at very high frequency as compared to the PWM frequency and use a standard control method or use a hysteretic or peak current control method to obtain very fast and precise current control. The buck converter 201 can be by-passed with a switch (FET or otherwise) during the analog dimming portion where the primary current control is used to minimize any additional losses at full output. The first switch (Q1) 302, which is a bypass switch, can be one of a variety of controllable switches (e.g., a FET) and, in the present embodiment, can be a comparatively slow switching device as it only needs to turn on above 10% dim (for example) and is off below this level. The first switch (Q1) 302 can be have a comparatively low on-resistance. The capacitance of first switch (Q1) 302 is of minor consideration in circuit design because there are low switching losses in first switch (Q1) 302. In particular, in representative embodiments, the dim command is relatively fixed and changes only when the user changes a set point. For instance and continuing with the same example, if a dimming command of 11% of the maximum current is given, then first switch (Q1) 302 is 'on' and converter 201 provides the constant current of 11% to the LEDs. Note that the first switch (Q1) 201 never turns off in this condition and the second switch (Q2) 303 never turns on, so there are no switching losses. By contrast, for example if the dim command is 9% of the maximum current is given, then the first switch (Q1) 302 is 'off' and the buck converter 301 provides the constant current control. In this range of operation, the first switch (Q1) is not switching but rather is 'off.' Again there are no switching losses contributed by the first switch (Q1) 302.

In operation, based on the dimming input, the controller 201 provides the reference voltage (Vref) 204 and the PWM signal 203. When the reference voltage (Vref) 204 is above a dimming threshold (e.g., 10% of the maximum current amplitude to the LEDs) the first switch (Q1) 302, which functions as a shunt switch, of the buck converter 301 is biased to conduct (i.e., is 'on') by the converter 201. Thus for dimming inputs to the controller 202 of 0% dimming (i.e., maximum current amplitude to the LEDs) to the minimum analog dim setting (10% of the maximum current amplitude as an example), Buck converter 301 produces a regulated output current to the LEDs via the first switch (Q1) 302. The remaining components of the buck converter 301, namely second switch (Q2) 203, inductor (L2) 304, resistor (R3) 305 and diode (D1) 306 are all by-passed to minimize losses. For dimming inputs to the controller 101 less than the threshold (e.g., less than 10% of the maximum amplitude current to the LED), the first switch (Q1) 302 is not conducting, and the converter 201 regulates the voltage across the capacitor (C1) 307 to a voltage greater than the turn-on LED voltage. Accordingly, the buck converter 301 is enabled to regulate the LED current at the 10% analog level. In addition, the second switch (Q2) 203 is turned on and off by the PWM 103, and thus the buck converter 301 is then turned on and off at a fairly low PWM frequency (100 Hz to 1000 Hz for example) by the controller 101. The duty cycle of the buck converter 301 is then adjusted based on the PWM signal, in essentially the same manner as in circuit 200 to give a PWM current in the LEDs that is proportional to the dim command (smaller on time at low dim and larger at off time).

In a representative embodiment, in order to avoid any control loop response issues, the buck converter 301 can be controlled via hysteretic current control during the on time to give a comparatively fast response time with substantially no current overshoot in the LEDs. However, alternative current control methods such as peak current control, standard current mode control or critical conduction current control can be used depending on the required specifications. Since the buck converter 301 circuit is only active during deep dimming (below 10% for example), the second switch (Q2) 303, the diode (D1) 306 and inductor (L2) 304 only need to be designed to handle the 10% current level, not the full output current. This also allows one to choose a switch (e.g., a MOSFET) and diode with comparatively small capacitance that allows fast switching frequency of the buck converter 301 without excessive losses. Finally, the buck converter 301 can be placed in the positive LED current connection as shown or the negative side to make driving of the FET simpler (ground referenced). Other configurations within the purview of one of ordinary skill in the art are contemplated.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Any reference numerals or other characters, appearing between parentheses in the claims, are provided merely for convenience and are not intended to limit the claims in any way.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A dimming circuit for an LED, comprising:
    a current controller configured to receive a dimming input and to output a pulse width modulation signal (PWM) and a reference voltage;
    a current converter configured to provide an output current; and
    a shunt switch connected to the controller and to the current converter and between the current controller and the LEDs, wherein the shunt switch is non-conducting when the dimming input exceeds a threshold level.

2. A dimming circuit as claimed in claim 1, wherein the shunt switch is conducting when the dimming input is less than the threshold level.

3. A dimming circuit as claimed in claim 1, further comprising a first inductor connected between the current converter and the shunt switch, wherein a current through the first inductor is proportional to the threshold level when the shunt switch is non-conducting.

4. A dimming circuit as claimed in claim 1, wherein the controller comprises circuitry configured to receive a dimming input and output the PWM signal and the reference voltage.

5. A dimming circuit as claimed in claim 4, wherein the controller comprises a memory comprising a correlation of the dimming input to the PWM signal and the reference voltage.

6. A dimming circuit as claimed in claim 1, wherein the controller comprises a programmable logic device (PLD) configured to receive a dimming input and output the PWM signal and the reference voltage.

7. A dimming circuit as claimed in claim 1, wherein the threshold level is a value representative of a percentage of a maximum drive current to the LEDs.

8. A dimming circuit as claimed in claim 7, wherein the value is in the range of approximately 0% of the maximum current level to approximately 10% of the maximum current level.

9. A dimming circuit for an LED, comprising:
a controller configured to receive a dimming input, and to provide a pulse width modulation signal (PWM) and a reference voltage;
a current converter configured to provide an output current; and
a buck converter connected between the LEDs and current converter, wherein the buck converter comprises a shunt switch that is non-conducting when the dimming input is less than a threshold level.

10. A dimming circuit as claimed in claim 9, wherein the shunt switch is conducting when the dimming input is greater than the threshold level.

11. A dimming circuit as claimed in claim 9, further comprising a first inductor connected between the current converter and the buck converter, wherein a current through the first inductor is proportional to the threshold level when the shunt switch is conducting.

12. A dimming circuit as claimed in claim 9, wherein the controller comprises a microprocessor configured to receive a dimming input and output the PWM signal and the reference voltage.

13. A dimming circuit as claimed in claim 12, wherein the controller comprises a memory comprising a correlation of the dimming input to the PWM signal and the reference voltage.

14. A dimming circuit as claimed in claim 9, wherein the controller comprises a programmable logic device (PLD) configured to receive a dimming input and output the PWM signal and the reference voltage.

15. A dimming circuit as claimed in claim 9, wherein the threshold level comprises a value representative of a percentage of a maximum drive current to the LEDs.

16. A dimming circuit as claimed in claim 9, wherein the value is in the range of approximately 0% of the maximum current level to approximately 10% of the maximum current level.

* * * * *